United States Patent [19]

Hosokawa et al.

[11] Patent Number: 5,681,626
[45] Date of Patent: Oct. 28, 1997

[54] HEAT RECOVERABLE ARTICLES

[75] Inventors: Takehiro Hosokawa; Hiroshi Hayami; Shuji Adzuma, all of Osaka, Japan

[73] Assignee: Sumitomo Electric Industries, Ltd., Osaka, Japan

[21] Appl. No.: 509,653

[22] Filed: Jul. 31, 1995

Related U.S. Application Data

[63] Continuation of Ser. No. 215,392, Mar. 21, 1994, abandoned, which is a continuation of Ser. No. 891,172, May 29, 1992, abandoned.

[30] Foreign Application Priority Data

May 29, 1991 [JP] Japan .................................. 3-153876
Feb. 19, 1992 [JP] Japan .................................. 4-069655

[51] Int. Cl.$^6$ .................................. F16B 4/00; B65B 53/02
[52] U.S. Cl. .................. 428/34.9; 428/349; 428/355; 428/913; 428/921; 138/141; 174/DIG. 8
[58] Field of Search .................. 174/DIG. 8, 35 R; 428/34.9, 913, 355, 480, 482, 483, 520, 458, 349, 921; 138/155, 141

[56] References Cited

U.S. PATENT DOCUMENTS

| | | | |
|---|---|---|---|
| 4,265,801 | 5/1981 | Moody et al. | 428/450 |
| 4,275,180 | 6/1981 | Clarke | 428/463 |
| 4,338,227 | 7/1982 | Ballard | 524/143 |
| 4,407,888 | 10/1983 | Crofts | 428/355 |
| 4,430,468 | 2/1984 | Schumacher | 524/109 |
| 4,431,861 | 2/1984 | Clabburn et al. | 28/34.9 |
| 4,634,615 | 1/1987 | Nersteegh | 428/34.9 |

Primary Examiner—Rena Dye
Attorney, Agent, or Firm—Wenderoth, Lind & Ponack

[57] ABSTRACT

The invention provides a heat recoverable article, like a heat shrinkable tubing, which is used for the joint or terminal arrangement of electric cables, wherein an inner layer is formed on the inner surface of the heat recoverable article comprising a polymer material. A resin composite containing ethylene alkyl(meth) acrylate carbon monoxide copolymer is used for the inner surface, to produce a heat shrinkable tubing having an outstanding adhesive property to adherents, without suffering from foaming during the manufacturing process since this inner layer has little hygroscopic property.

10 Claims, No Drawings

HEAT RECOVERABLE ARTICLES

This application is a Continuation of now abandoned application, Ser. No. 08/215,392 filed Mar. 21, 1994, which is a continuation of now abandoned application, Ser. No. 07/891,172 filed May 29, 1992.

BACKGROUND OF THE INVENTION

1. Field of the Invention

This invention relates to heat recoverable articles like heat shrinkable tubings suitable for joints or terminal arrangements of electric cables and the like.

2. Description of the Prior Art

Heat recoverable articles like heat shrinkable tubings are used for applications such as joints of electric cables, terminal protection arrangement of wiring in many equipments or anticorrosion treatment of steel pipes.

When a joint part of the electric cables is covered with the heat shrinkable tubing followed by heating, the tubing shrinks along the shape of the joint part and contracts so tightly to the part that it can be protected from external injuries. When a higher adhesive property is required, such as waterproof property, a heat shrinkable tubing having an inner layer which comprises adhesive resin is used.

Ethylene vinylacetate copolymer (EVA), ethylene ethylacrylate copolymer (EEA), hot-melt type adhesive resin based on these copolymers and hot-melt adhesive resin comprising polyamide or saturated ester copolymer are conventionally used as the inner layer (for examples, see Japanese Laid-open Patent Publications SHO 54-84294, SHO 56-17218 and SHO 60-22413). The adhesive resin to be used as the inner layer is appropriately selected from the above-described resins depending on the material of the heat shrinkable tubing on which the inner layer is painted and substrates to be treated respectively.

A conventional method for manufacturing the heat shrinkable tubing comprises the following steps, i.e. : ① molding a resin composition into a tubular shape; ② cross-linking the polymer material by irradiating an ionizing radiation like electron beam or γ-ray or by means of chemical cross-linking or silane type cross-linking; ③ expanding the tube in an environment of high temperature; and ④ cooling the tube while maintaining its expanded shape.

Among these manufacturing methods, the cross-linking method by irradiating the ionizing radiation, in particular, has been widely used in industries as a cross-linking method of the heat shrinkable tubings because of a short cross-linking reaction time as well as excellent productivity. The heat shrinkable tubing having the inner adhesive layer is also cross-linked by ionizing radiation.

Polyamide based hot-melt adhesive resins have been most widely used as the inner layer of the heat shrinkable tubing. Their adhesive property to the adherent is outstanding. However, the polyamide based hot-melt adhesive resins had, in addition to being expensive, a deficiency that they are very hygroscopic and therefore liable to foam during their manufacturing process. Moreover, since the saturated ester copolymer based resins showed similar properties to the polyamide based hot-melt adhesive resin, they could not be satisfactory materials to solve the foaming problem.

Because copolymers mainly polymerized from ethylene and vinyl acetate (VA) had a low hygroscopic property and a good adhesive property to relatively many kinds of substances, EVA based copolymers were sometimes used as the inner layer. Since most of the EVA based copolymers had, however, a deficiency that they were poor in the adhesive property to polyvinyl chloride (PVC), they were seldom used for the adhesive resin when the adherent was made of PVC. Therefore, development of an inexpensive adhesive resin composition with an excellent adhesive property to many adherents, and having a low hygroscopic property is desired.

SUMMARY OF THE INVENTION

Accordingly, the object of this invention is to provide a heat recoverable article in which an inexpensive inner layer having a low hygroscopic property and good adhesive property to many adherents is used.

The inventors of this invention found, through extensive studies, that the afore-described object could be attained by using a resin, comprising an ethylene alkyl (meth)acrylate carbon monoxide copolymer as a main component, for the inner layer, thereby completing this invention on the basis of this fact.

DESCRIPTION OF THE PREFERRED EMBODIMENTS

Thus, the present invention provides a heat recoverable article comprising polymeric materials, and characterized by having an inner layer containing an ethylene alkyl (meth)acrylate carbon monoxide copolymer formed on its inner surface.

The heat recoverable articles like the heat shrinkable tubings used in this invention are not particularly limited, but they comprise the materials manufactured from many polymer materials by conventional methods.

Examples of the polymer materials are polyethylene, polyvinyl chloride (PVC), ethylene vinyl acetate copolymer (EVA), ethylene ethyl acrylate copolymer (EEA), chlorinated polyethylene, various kinds of thermoplastic elastomers (polyester elastomer, for example) and the like. Various kinds of additives such as cross-linking agent or fillers may be contained in these polymer materials, if required.

The substrate to be treated by the heat recoverable articles according to this invention is not limited, and examples of the substrate materials are metals such as copper, iron, aluminum, tin or nickel, glass or various kinds of polymer materials.

Ethylene alkyl(meth)acrylate carbon monoxide copolymers are used as the inner layer in this invention. The term of alkyl(meth)acrylate in this invention means alkyl acrylate or alkyl methacrylate.

Examples of ethylene alkyl(meth)acrylate carbon monoxide copolymers are ethylene methyl acrylate carbon monoxide copolymer, ethylene ethyl acrylate carbon monoxide copolymer or ethylene methyl methacrylate carbon monoxide copolymer.

The composition of these ethylene alkyl(meth) acrylate carbon monoxide copolymers to be used for the inner layer is not particularly limited, but it is desirable that the melt-flow index (MI) as measured at 190° C. under a load of 2.16 kg is usually in the range of 1 to 500 g/10 min., preferably from 5 to 400 g/10 min. In case the MI value is less than 1, the adhesive property to the treated substrate is poor since its melt flow property is insufficient. In case the MI value is over 500, on the other hand, the inner layer will flow out during the tube expanding process.

When the heat shrinkable tubing is cross-linked by irradiating the ionizing radiation, decrease in melt-flow property by irradiating ionizing radiation can be more effectively prevented by adding anti-oxidants such as (hindered) phenols, organic sulfur compounds, amine compounds or phosphite compounds or hydroquinone derivatives to the ethylene alkyl(meth)acrylate carbon monoxide copolymers. Various kinds of additives such as flame retarder or color pigments can be further blended with the copolymers, if required.

The ethylene alkyl(meth)acrylate carbon monoxide copolymers are observed to have a tendency to be colored when they have been exposed to an environment of high temperature. As a result, the heat recoverable articles having the copolymer as an inner layer have a problem that transparency of the material deteriorates. The investigators of this invention had examined this problem and found that the problem could be improved by adding a light stabilizer to the ethylene alkyl(meth)acrylate carbon monoxide copolymer. Examples of the light stabilizer are hindered amine compounds, salicylic acid derivatives, benzophenone derivatives and benzotriazole derivatives, the hindered amine compounds being preferably used among them. The amount of the light stabilizer to be used is, based on 100 parts by weight of the ethylene alkyl(meth)acrylate carbon monoxide copolymer, 0.1 to 10 parts by weight and preferably from 0.5 to 5 parts by weight. When the amount used is less than 0.1 parts by weight, the efficiency of coloring prevention becomes small, while an amount over 10 parts by weight is not preferable since the light stabilizer blooms.

For the purpose of forming a layer comprising the ethylene alkyl(meth)acrylate carbon monoxide copolymer on the inner surface of the heat recoverable articles, it is preferable to apply a melt-extrusion molding method by means of co-extrusion of the polymer material forming the tubing with the material including the copolymer which forms the inner layer.

The heat shrinkable tubing having an inner layer can be cross-linked by irradiating the ionizing radiation. Of course, it is no problem to use the ethylene alkyl (meth)acrylate carbon monoxide copolymer for the inner layer even when the heat shrinkable tubing is cross-linked by a chemical cross-linking method or a silane type cross-linking method. It is needless to say that a blended material of the ethylene alkyl(meth)acrylate carbon monoxide copolymer with a polymer material compatible with the copolymer can be used for the inner layer according to this invention.

EXAMPLES

This invention is described hereinafter in more detail referring to the examples. This invention is, however, not limited to the description as set forth in the examples.

The methods for evaluating the properties of the articles are as follows.

Adhesive Property

After the sample was covered on the various kinds of electrical cables and heat-shrinked, allowing it to contract, the covered tubing and its inner layer was cut along the longitudinal direction of the cable in a half-cylindrical form. The tip of the heat shrinked tubing with an inner layer was peeled off from the cable and bent to an angle of 180 degrees and, followed by holding the tip, the peeling strength when the tubing and its inner layer was peeled off from the cable at a tensile velocity of 50 mm/min was measured. The results were evaluated in three grades as follows.

⊚: The peeling strength is 5 kg/25 mm or more.

○: The peeling strength is 1 kg/25 mm or more and less than 5 kg/25 mm.

x : The peeling strength is less than 1 kg/25mm.

(Buried degree and foaming degree of inner layer resin)

The sample was cut and its cross section was inspected for any crevice or foaming. As for the evaluation of buried degree, those in which any crevices were not observed were ranked good and those having some crevices were ranked not good.

Resistivity against thermal

As for the evaluation of coloring after heat-aging, several sheets with 1 and 2 mm in thickness were prepared by using each composition of the inner layer. After allowing the sheets to stand in a gear oven at 140° C. for one week, an evaluation was carried out visually to see if transparency of the sheet was kept or not. The evaluation standard was as follows.

⊚: The sheet is transparent even when the thickness is 2 mm.

○: The sheet is transparent when its thickness is 1 mm.

x : The sheet is not transparent in both cases described above.

Example 1

An outer layer was co-extruded with an inner layer by using a flame retarder EVA resin composition (MI=3 g/10 min., vinylacetate content=25% by weight) as an outer layer and a resin composition, prepared by adding 3 parts by weight of triethyleneglycol-bis[3-(3-t-butyl-5-methyl-4-hydroxyphenyl)propionate] as an antioxidant and 1 part by weight of 2,4-dihydroxybenzophenone as a light stabilizer to 100 parts by weight of ethylene ethyl acrylate carbon monoxide copolymer (MI=10 g/10 min.), as an inner layer, thereby manufacturing a tubing having an inner layer with an Outer diameter of the outer layer of 6 mmφ (inner diameter of the outer layer of 5 mmφ) and an inner diameter of the inner layer of 4 mmφ.

The tubing was irradiated in the dose of 15 Mrad at 1 MV accelerate voltage by electron accelerator.

Then, the tubing obtained was expanded in a constant temperature chamber so that the inner diameter of the inner layer became 8 mmφ, thereby manufacturing a heat shrinkable tubing.

An electric cable (5 mmφ coated with polyvinyl chloride (PVC), polyethylene and polyester resins was covered with the heat shrinkable tubing obtained, and the tube was allowed to contract by heating.

Buried degree, foaming property, adhesive property and coloring after heat aging were examined by using the resin-coated electric cable covered with the heat shrinkable tubing thus obtained. The results are shown in Table 1.

Example 2

A test sample was manufactured by the same method as described in Example 1, except that an ethylene ethyl acrylate carbon monoxide copolymer with MI=100 g/10 min. was used as a copolymer for the inner layer.

Example 3

A test sample was manufactured by the same method as described in Example 1, except that an ethylene methyl acrylate carbon monoxide copolymer with MI=10 g/10 min. was used as a copolymer for the inner layer.

Example 4

A test sample was manufactured by the same method as described in Example 1, except that a resin composite in which 20 parts by weight of decabromodiphenyl ether and 5 parts by weight of antimony trioxide were further added to the afore-described resin composite as flame retarder, was used for the inner layer.

Example 5

A test sample was manufactured by the same method as described in Example 1, except that the light stabilizer to be added to the inner layer was replaced by a hindered amine light stabilizer Of bis(2,2,6,6-tetramethyl-4-piperidyl) sebacate.

Example 6

A test sample was manufactured by the same method as described in Example 1, except that a resin composition prepared without adding the light stabilizer was used as an inner layer.

Comparative Example 1

A test sample was manufactured by the same method as described in Example 1, except that a polyamide of hot-melt inner type adhesive resin with MI=10 g/10 min. was used as an inner layer instead of ethylene ethyl acrylate carbon monoxide copolymer.

Comparative Example 2

A test sample was manufactured by the same method as described in Example 1, except that a saturated ester copolymer with MI=10 g/10 min. was used as an inner layer instead of ethylene ethyl acrylate carbon monoxide copolymer.

Comparative Example 3

A test sample was manufactured by the same method as described in Example 1, except that an ethylene-vinyl-acetate copolymer (EVA) with MI=10 g/10 min. (VA content 28% by weight) was used as an inner layer instead of ethylene ethyl acrylate carbon monoxide copolymer.

The heat shrinkable tubings according to Examples 1 to 6 are outstanding in the characteristics of their inner layer since the heat shrinkable tubings have a good buried degree and do not produce foaming problems, and are excellent in the adhesive property to many adherents, especially to PVC. As for the coloring after the heat aging, however, the heat shrinkable tubing according to Example 6 in which no light stabilizer was added showed a large degree of coloring as compared with the observation that the heat shrinkable tubings according to Examples 1 to 5, in which light stabilizers, especially hindered amine light stabilizers, were added, showed little coloring.

The heat shrinkable tubings according to Comparative Examples 1 to 2 have a poor adhesive strength to polyethylene, besides exhibiting foaming. Moreover, the heat shrinkable tubing according to Comparative Example 3 is poor in the adhesive property to polyester or PVC although it has no problem in buried degree, foaming and coloring after the aging treatment.

A heat shrinkable tubing which is outstanding in the adhesive property to many adherents is provided according to this invention, without suffering from foaming during the manufacturing process because the material has a low hygroscopic property. Use is made of a resin composition whose main component comprises an ethylene alkyl(meth) acrylate carbon monoxide copolymer as an inner layer of a heat recoverable article for the heat shrinkable tubing and the like.

What is claimed is:

1. A multilayer heat recoverable article comprising polymer materials, characterized in that an adhesive inner layer containing an ethylene-alkyl acrylate-carbon monoxide or ethylene-alkyl methacrylate-carbon monoxide copolymer is formed on the inner surface of the article, wherein the copolymer is not cross-linked and has a melt-flow index of 1 to 500 g/10 min as measured at 190° C. under a load of 2.16 kg.

2. A heat recoverable article according to claim 1, wherein the inner layer contains a light stabilizer in a range from 0.1

TABLE 1

| | Example | | | | | | Comparative Example | | |
|---|---|---|---|---|---|---|---|---|---|
| | 1 | 2 | 3 | 4 | 5 | 6 | 1 | 2 | 3 |
| (Blending of inner layer) | | | | | | | | | |
| Ethylene.ethyl acrylate.CO copolymer (MI = 10) | 100 | | | 100 | 100 | 100 | | | |
| Ethylene.ethyl acrylate.CO copolymer (MI = 100) | | 100 | | | | | | | |
| Ethylene.methyl acrylate.CO copolymer (MI = 10) | | | 100 | | | | | | |
| Polyamide (MI = 10) | | | | | | | 100 | | |
| Saturated copoly-polyester (MI = 10) | | | | | | | | 100 | |
| EVA (MI = 25, VA = 28 wt %) | | | | | | | | | 100 |
| Decabromodiphenyl ether | | | | 20 | | | | | |
| Antimony trioxide | | | | 5 | | | | | |
| Antioxidant *1 | 3 | 3 | 3 | 3 | 3 | 3 | 3 | 3 | 3 |
| Benzophenone series light stabilizer *2 | 1 | 1 | 1 | 1 | | | 1 | 1 | 1 |
| Hindered amine series light stabilizer *3 | | | | | 1 | | | | |
| Buried degree of the inner layer | good | good | good | good | good | good | good | good | good |
| Foaming of the inner layer | Non | Non | Non | Non | Non | Non | Yes | Yes | Non |
| Transparency of the inner layer after heat aging | ○ | ○ | ○ | ○ | ◎ | X | ○ | ○ | ◎ |
| Adhesive property to the adherent | | | | | | | | | |
| to PVC cable | ◎ | ◎ | ◎ | ○ | ◎ | ◎ | ◎ | ◎ | X |
| to polyethylene cable | ○ | ○ | ○ | ○ | ○ | ○ | X | X | ○ |
| to polyester cable | ○ | ○ | ○ | ○ | ○ | ○ | ○ | ◎ | X | to 10 parts by weight based on 100 parts by weight of the ethylene-alkyl acrylate-carbon monoxide copolymer.

3. A heat shrinkable tubing according to claim 1.

4. A heat recoverable article according to claim 1, characterized in that the copolymer is an ethylene-ethyl acrylate-carbon monoxide copolymer.

5. A heat recoverable article according to claim 1, characterized in that a flame retarder agent is added to the inner layer.

6. A heat recoverable article according to claim 1, wherein the melt-flow index of the copolymer is 5 to 400 g/10 min.

7. A heat recoverable article according to claim 1, wherein the melt-flow index of the copolymer is 10 to 400 g/10 min.

8. A heat shrinkable tubing according to claim 2.

9. A heat recoverable article according to claim 2, characterized in that the copolymer is an ethylene-ethyl acrylate-carbon monoxide copolymer.

10. A heat recoverable article according to claim 2, characterized in that a flame retarder agent is added to the inner layer.

* * * * *